United States Patent [19]

Urquhart

[11] 4,263,122

[45] Apr. 21, 1981

[54] ELECTROCOATING EQUIPMENT

[75] Inventor: Thomas N. Urquhart, Troy, Mich.

[73] Assignee: Programmed Coating Systems, Inc., Farmington Hills, Mich.

[21] Appl. No.: 99,650

[22] Filed: Dec. 3, 1979

[51] Int. Cl.$^3$ ............................................. B65G 49/02
[52] U.S. Cl. ............................. 204/300 EC; 204/198; 204/202; 204/205; 204/211
[58] Field of Search ................. 204/181 EC, 300 EC, 204/198, 199, 202, 205, 211, 217

[56] References Cited

U.S. PATENT DOCUMENTS

| | | | |
|---|---|---|---|
| 3,418,233 | 12/1968 | Igras et al. | 204/300 EC |
| 3,496,082 | 2/1970 | Orem et al. | 204/300 EC |
| 3,620,952 | 11/1971 | Chiappe | 204/198 |
| 3,752,750 | 8/1973 | Matsushita et al. | 204/300 X |

Primary Examiner—G. L. Kaplan
Attorney, Agent, or Firm—Barnes, Kisselle, Raisch & Choate

[57] ABSTRACT

Electrocoating equipment having a conveyor I-beam monorail with a plurality of trolleys movable therealong for carrying parts through a bath to be electrocoated. The trolley comprises wheels, yoke arms dependent from the wheels below the rail and a part carrier suspended from the arms. A chain drive interconnects and propels the trolleys. An electrical grounding shoe in the form of one or more hollow pipes, bars or cables is suspended from the monorail between the rail and yoke arms and is electrically connected to the ground return side of a power supply system associated with said electrocoating equipment. The grounding shoe is disposed in sliding electrical contact with at least one of the trolley arms and extends along the path of travel thereof while the same is transitting the electrocoating bath of said equipment. The grounding shoe is yieldably biased into such sliding contact within the space defined between the yoke arms and has at least a limited degree of vertical movement relative to said rail to accommodate like movement of the trolley arm during its transit of the grounding shoe. Preferably the grounding shoe has a curved exterior surface with a radius of curvature such that the shoe makes a dual tangential contact with the yoke arms along the interior surfaces thereof at one point on each arm spaced above the vertex arm junction of the yoke. A trolley cleanout obstruction is fixed on the rail adjacent the path of travel of the trolley yoke arms and upstream of the grounding shoe. The trolley cleanout normally has a slight clearance with said yoke arms and is adapted to dislodge foreign matter clinging thereto or to obstruct movement of the trolley should such foreign matter remain adhered thereto upon striking the trolley cleanout.

26 Claims, 18 Drawing Figures

ELECTROCOATING EQUIPMENT

This invention relates to electrocoating equipment, and more particularly to monorail conveyor systems for supporting articles to be electrocoated and the associated electrical grounding systems for such electrocoating equipment.

BACKGROUND OF THE INVENTION

Although relatively in its infancy, electrocoating, sometimes termed anodic-hydrocoating, is a process of applying organic finishes through the use of electrical energy. In carrying out the basic process, an article to be coated is immersed in an electrolyte, defined as a specially formulated, water-soluble paint, where electrical current is then passed through the article and the electrolyte for a given period of time. Upon application of electrical energy, the resin and pigment forming part of the aforesaid electrolyte migrate to the article and a film is irreversibly deposited thereon. Thereafter, and in a typical procedure, the article may be rinsed, dried and baked, either directly, or after being overcoated wet on wet with a conventional compatible paint.

In continuous type electrocoating processes, the parts to be coated are typically individually suspended from associated overhead trolleys which track on an I-beam monorail conveyor, such as illustrated in the Koch et al U.S. Pat. No. 3,640,814. One problem encountered with such conveyorized systems has been the provision of an adequate bus bar grounding contact structure capable of maintaining the trolley arms at electrical ground potential so that arcing or sparking does not occur through the ball bearings of the trolley wheels which, in turn, make electrical contact with the overhead monorail beam which is preferably employed as the main ground bus bar leading to the main ground terminal of the power supply of the electrocoating system. Attempts to solve this problem are illustrated, for example, in the prior art Boost et al U.S. Pat. No. 3,669,870 and Koch et al U.S. Pat. No. 3,607,711. However, these prior art efforts to solve the grounding problem involved considerable additional leaf-spring brushes and associated mounting super-structure. Moreover, by utilizing wiper spring commutation with the drive chain of the conveyor, these prior systems posed additional problems of brush and chain wear and intermittent electrical contact, as well as interference from the chain lubricants, resulting in less than optimum system performance as well as relatively high cost in terms of materials, fabrication, installation and maintenance.

OBJECTS OF THE INVENTION

Accordingly, among the objects of the present invention are to provide an improved conveyorized electrocoating system and electrical grounding apparatus therefor which (1) overcomes the aforementioned problem of galling and wear of the trolley wheel bearings, (2) is economical to fabricate, install and maintain, (3) is readily adaptable to existing overhead monorail chain-driven conveyors, (4) operates with less power consumption and (5) provides enhanced performance of the electrocoating system.

Other objects, features and advantages of the present invention will become apparent from the following detailed description and accompanying drawings wherein:

For the purposes of promoting understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
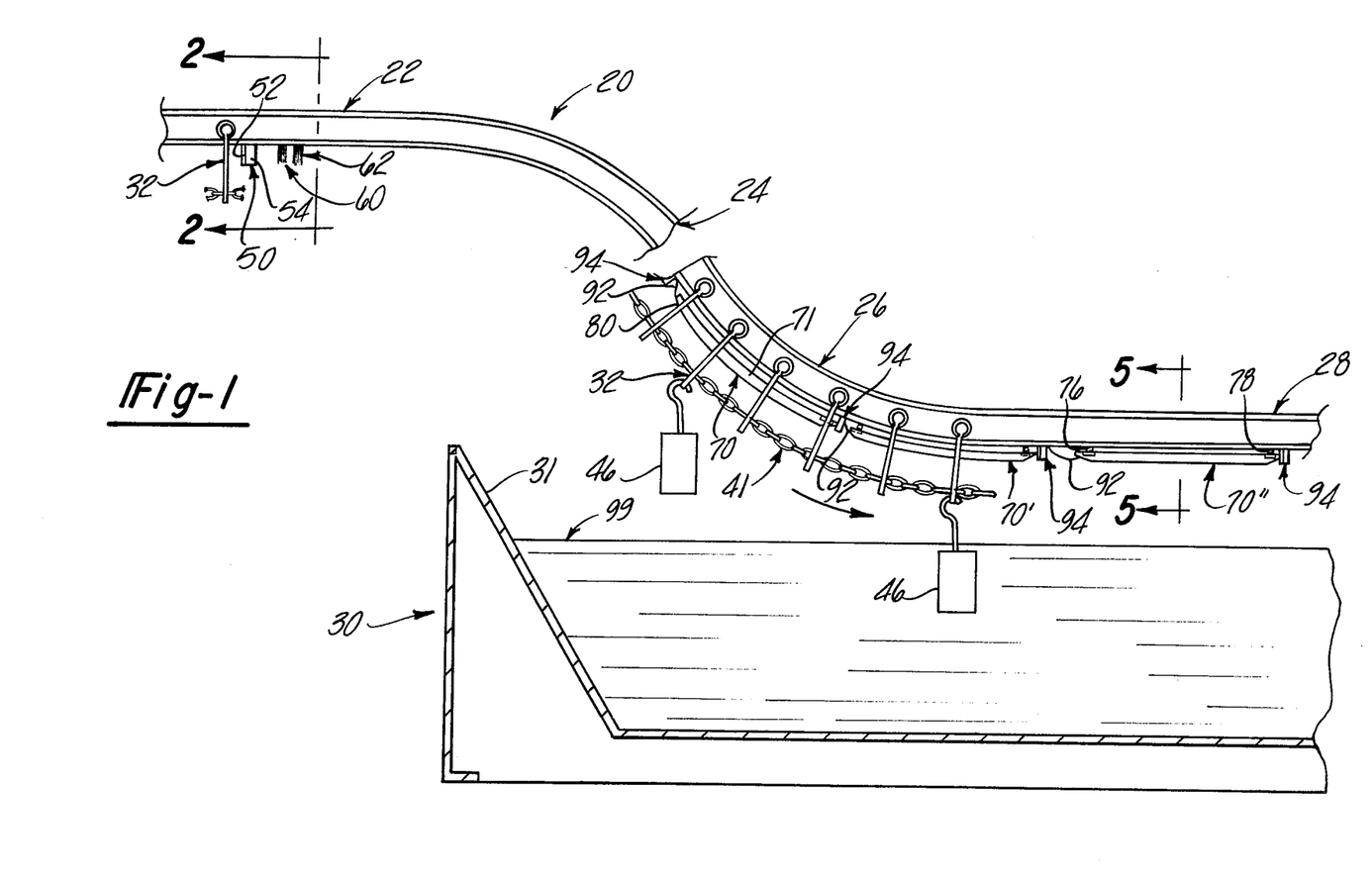
FIG. 1 is a fragmentary semi-schematic elevational view of a monorail conveyor system of an electrocoating processing line illustrating one embodiment of the present invention.
Figure 2:
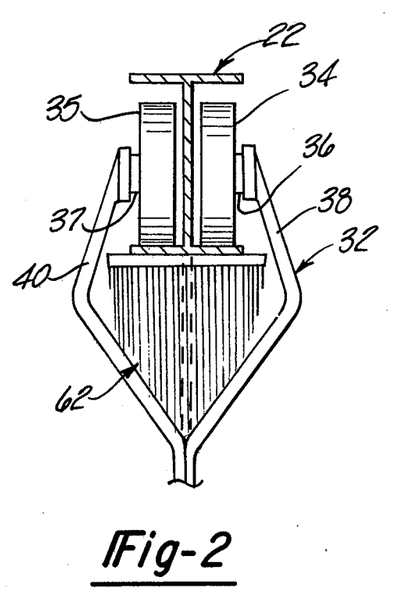
FIG. 2 is a vertical cross sectional view taken on line 2—2 of FIG. 1.

Referring to FIGS. 1 and 2, a first embodiment of the invention is illustrated in combination with conventional I-beam monorail conveyor track 20 having a first horizontally extending section 22, a downwardly curved section 24, a reversely curved but still downwardly extending section 26 and a lower elevation second horizontally extending section 28. A conventional electrocoat tank 30 is disposed beneath track sections 26 and 28 with an outwardly and upwardly diverging entrance end 31 disposed beneath section 26. It is to be understood that tank 30 is preferably symmetrical with an exit end (not shown) disposed oppositely from end 31, and upwardly curved exit sections of track are also provided (not shown) corresponding to sections 24 and 26 and arranged to elevate the parts out of the bath and to transport the same onward for further processing and/or unloading as may be conventional in conveyorized electrocoating systems.

Figure 5:
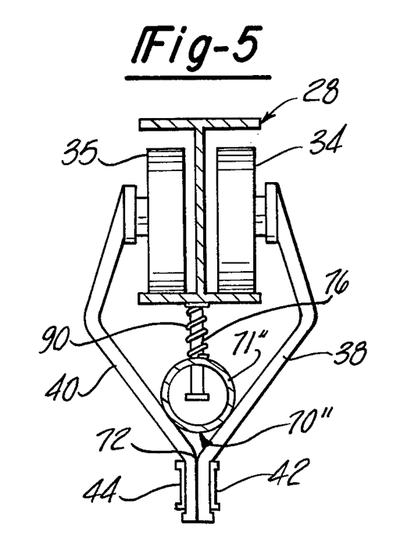
FIG. 5 is a vertical cross-sectional view taken on line 5—5 of FIG. 1.
Figure 6:
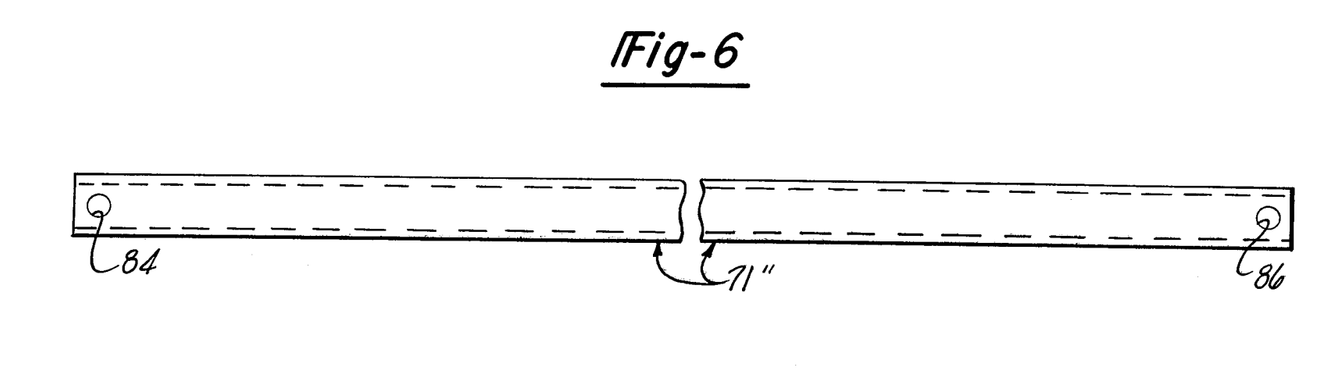
FIG. 6 is a top elevational view of a grounding shoe employed in the system of FIG. 1.

As best seen in FIG. 2, monorail 20 comprises an I-section beam 22 which serves as a dual track way for a conventional trolley assembly 32. Trolley 32 comprises a pair of wheels or rollers 34 and 35 each journalled by ball bearings on an associated axle stubs 36 and 37 respectively which in turn protrude from arms 38 and 40 respectively. These arms are joined together at their lower ends in flanking relation to a conventional hanger bracket (not shown). A conventional conveyor chain 41 (FIG. 1) is attached at brackets 42 and 44 (FIG. 5) to the lower ends of arms 38 and 40 so as to drivingly interconnect the trolleys for propulsion of the same in tracking relation along monorail 20. The parts 46 to be electrocoated in tank 30 are individually hung from the associated hanger brackets of the conveyor trolleys 32 as indicated in FIG. 1.

Figure 3:
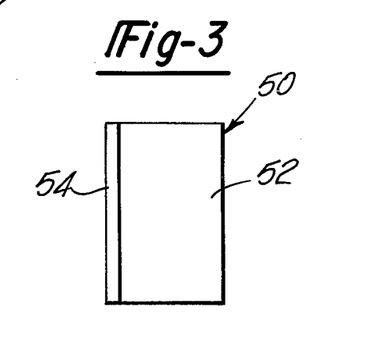
FIG. 3 is a side elevational view of a trolley cleanout bracket also shown in FIG. 1.
Figure 4:
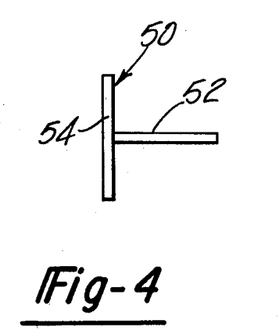
FIG. 4 is a top view of the cleanout bracket of FIG. 3.

In accordance with one feature of the invention, a trolley cleanout obstruction bracket 50 is mounted as by welding to the underside of the lower flange of rail section 22 at a point in the path of travel of the trolleys upstream of the electrocoating bath 30. As shown in FIGS. 3 and 4, bracket 50 comprises a pair of upright plates 52 and 54, plate 52 being welded along one side edge to the center of one side of plate 54, and this subassembly is welded along the upper edges of plates 54 and 52 to the under surface of beam 22. Plate 54 is contoured in front elevational view complimentary to the interior space defined by and between arms 38 and 40 of the trolley assembly and positioned centrally in their path of travel so as to have a slight clearance with these arms as they travel past bracket 50.

In accordance with another feature of the present invention, slightly downstream in the travel of the trolleys from bracket 50 one or more trolley cleaning brushes 60 and 62 (FIG. 1) are mounted to the undersurface of beam 22. As best seen in FIG. 2 each brush 60,62 may have stainless steel or other wire bristles dependent from a holder of the brush. The brush is shaped to have a generally conical outside contour with a curvature or other geometry adapted to have a wiping interference fit with the inside surfaces of the trolley arms 38 and 40 as they travel by each brush.

In accordance with conventional electrocoating conveyor practice, monorail 20 is made of steel or other electrically conductive material and serves as the main ground conductor connected to the ground side of the system power supply.

In accordance with a further feature of the present invention, an improved electrical grounding system is provided to furnish the ground return path between monorail 20 and the suspended parts 56 in the electrocoating process circuitry associated with tank 30.

In the embodiment of the invention illustrated in FIGS. 1 through 10, the grounding system comprises a series of contact shoe assemblies 70,70',70" suspended beneath monorail 20 in tandem end-to-end relation. Each shoe 70,70',70" comprises a hollow pipe 71,71',71" made of steel or other electrically conductive material having an outside diameter adapted to span and make tangential dual contact with each trolley via the interior surface of each of the trolley arms 38 and 40 at a point on each arm spaced slightly above their vertex junction 72. As shown in FIG. 1, the pipes 71,71' of shoes 70,70' associated with the entrance section 26 of the monorail are curved along their longitudinal axes so as to have a shape complimental to the curvature of section 26 to thereby maintain constant sliding contact with each trolley as it descends along section 26. Pipes 71,71',71" are each mounted to track section 26 by a floating, spring-biased mounting arrangement consisting of a pair of shoulder bolts 76 and 78 (FIGS. 7, 8, 9 and 10) which are threaded at their upper ends 79 so as to be threadably received into threaded blind holes provided in the undersurface of the lower flange of sections 26 and 28 at appropriately spaced intervals. Each pipe 71,71',71" is cut away along its underside at approximately a 30° angle to provide a sloping entrance surface 80 at the leading end of the pipe, and a similar sloping surface 82 is provided at the trailing end of each pipe. Each pipe is provided with two stud holes 84 and 86 for slidably receiving studs 76 and 78 individually therethrough. A compression coil spring 90 loosely encircles each stud 76,78, and is captured at its ends between the upper surface of the associated pipe 71,71",71" and an associated spacer washer 81, which abuts the undersurface of the I-beam, to provide a downward spring bias acting at each end of pipe 71,71',71". Each pipe 71,71',71" is electrically grounded to monorail 20 at the leading end of the pipe by a flexible grounding safety strap 92 suitably secured and electrically connected at 94 to the underside of monorail beam 20. Inasmuch as track section 28 is a straight section running horizontally, shoe 70' is likewise a straight section of pipe 71' as shown in more detail in FIGS. 6 and 7. Downstream of the curved entrance shoes 70 and 70' and the first straight shoe 70" additional grounding shoes (not shown) are also provided, the same being mounted to the downstream horizontal track sections in the same manner as shoes 70,70',70" (FIG. 1).

Figure 7:
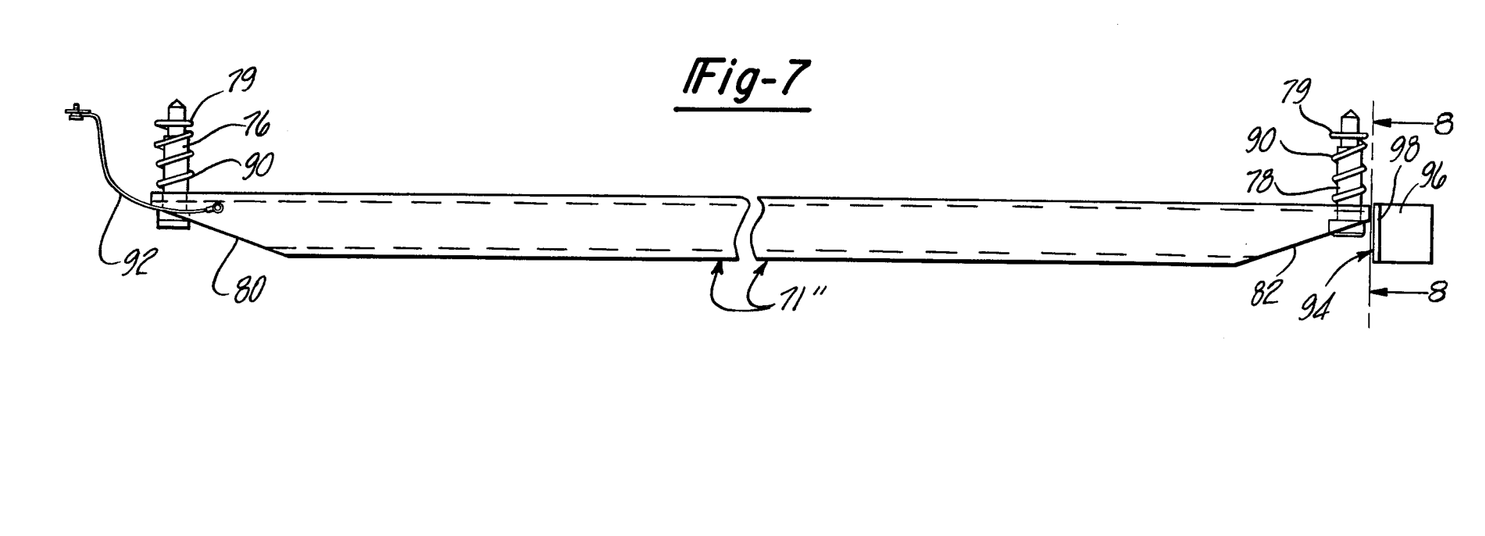
FIG. 7 is a side elevational view of the grounding shoe shown in FIG. 6 also showing the associated supporting studs, spring mounts, grounding safety stray and end stabilizer associated therewith in the system of FIG. 1.

At the trailing end of each shoe 70,70',70" an associated abutment bracket 94 is provided for axially stabilizing the shoe. As best seen in FIG. 7, each stabilizer bracket comprises two plates 96 and 98, one edge of plate 96 being welded to the center of the rear surface of plate 98. Both plates extend vertically and are welded at their upper edges to the undersurface of the associated track section. Plate 98 extends with its abutment surface facing the downstream end of the associated pipe 71,71',71" and is dimensioned vertically so as to provide a sliding abutment for the end edge of the pipe through its range of vertical floating movement on the mounting studs 76 and 78. Plate 98 also is contoured along its side edges such that its outside dimensions in a plane perpendicular to the path of travel of each trolley assembly 32 have ample clearance with the interior surfaces of the arms 38 and 40 thereof.

In operation, parts 46 to be electrocoated are individually suspended from the hanger bracket of each trolley assembly 32 at some point in the conveyor upstream of the electrocoating station, and the interconnected trolleys are advanced by the conveyor drive chain 41 along monorail 20. As each trolley 33 approaches cleanout bracket 50, it will travel past with a clearance and be unobstructed thereby unless the trolley arms 38 and/or 40 are contaminated by debris or other obstructing material adhered to one or both of the arms. If such is the case, the debris will either be knocked off the arm(s) or the trolley 32 will hang up on the bracket, thereby halting the forward motion of the entire conveyor and thus tripping the usual conveyor shutoff safety mechanism. When the maintenance personnel have cleaned the obstruction from the trolley assembly 32, conveyor drive is resumed.

The trolley next sequentially encounters the trolley brushes 60 and 62 which are mounted to have a wiping engagement with the interior surfaces of arms 38 and 40 from a point approximately at the elevation of the undersurface of the I-beam down to substantially the vertex junction 72 of the arms. This wiping engagement with the brushes insures a bright, clean electrical contact surface on arms 38 and 40 prior to their arrival at the electrocoating station.

As each trolley 32 begins its descent on the entrance track section 26, the trolley arms 38 and 40 will come into sliding, wiping engagement with the entrance end 80 of shoe pipe 71 and will cam the leading end of the pipe slightly upwardly against the bias of the associated support spring 90, thereby insuring a continuous electrically conductive sliding contact between pipe 71 at ties tangential point of contact with each of the arms 38 and 40. There is thus completed from this point onward throughout the travel of the trolley 32 along each shoe during its traverse of the electrocoating station a good electrical ground running from the immersed part 46 upwardly through its associated hanger support, hanger bracket, arms 38 and 40, pipe 71, and thence therethrough to the monorail beam 20 via strap 92.

Due to the curvature of the entrance grounding shoes 70 and 70′ being complimental to the downward arcuate path of travel of each trolley 32, such continuous contact is initiated at a travel point prior to entrance of part 46 into the electrocoat bath 99 so that a good grounding circuit is maintained from the point of first immersion of the part 46 into the electrocoating solution in the bath. Although not shown, it is to be understood that a similar condition is obtained by a symmetrical exit configuration of monorail 20 and associated grounding shoes at the trailing end of tank 30. Such grounding during the entrance descent and exit ascent travel of the trolleys 33 thus insures maximum immersion time for a given size electrocoat tank 30, thereby enhancing overall system efficiency.

The frictional sliding forces exerted by the trolleys 32 as they travel along grounding shoes 70,70′, et seq., is primarily taken by the abutment of the trailing end of each shoe with its associated stabilizer bracket 94, the pipe being free at its trailing end to slide up and down against the face of plate 98 of the stabilizer bracket. This insures that the pipe will remain free to float up and down on support studs 76,78 and also isolates the studs from shear forces which the shoe pipe would otherwise exert thereon.

After each trolley 32 has completed its traverse of the entrance of ground shoe 70, it continues traveling along monorail 20 and sequentially engages the tandem string of grounding shoes 70′, 70″ et seq. so as to have the sliding electrical ground contact throughout substantially its entire traverse of the electrocoating station.

Although there is a small gap between the longitudinally adjacent ends of each adjacent set of shoes, it is to be understood that the length of each shoe is correlated with spacing between each adjacent pair of trolleys 32 such that preferably at least three or more trolleys are traversing each shoe at any give time. Moreover, the gap between each adjacent set of shoes is less than the gap between each adjacent pair of trolleys. Thus, should any given trolley lose electrical grounding contact, as occurs during transit by the trolley of a gap between shoes, and as may also occur should any given trolley happen to lift a shoe out of contact with an adjacent leading or trailing shoe due to transient unequal drag conditions, there nevertheless will be maintained a good electrical grounding path to the shoe. That is, for any given immersed part 46 hanging from a trolley momentarily out of contact with a shoe, an electrically conductive grounding path will nevertheless still exist running from such part up through its hanger, hanger bracket and thence via chain 41 to the next adjacent shoe-grounded trolley. Of course, further branch grounding paths will also exist upstream and downstream via chain 41 and the remaining shoe-grounded trolleys.

As a result of these multiple low-resistance electrical grounding paths, any trolley momentarily out of contact with its associated shoe will still be maintained at the same ground potential as monorail 20. Hence no potential difference will exist between axles 36 and 37 through the wheel bearings mounted thereon to the associated trolley wheels 34 and 35 riding on the monorail beam 20 because this branch path is effectively short circuited by the grounding shoes maintaining the interconnected trolleys at ground potential. Thus, the possibility of sparks or arcing through the wheel bearings of each trolley is substantially eliminated, which in turn eliminates the problem of galling and pitting of the wheel bearings which otherwise would tend to greatly foreshorten bearing life.

The clean contact surfaces of the trolley arms, which are recleaned prior to each transit of a given electrocoating station, and the self-cleaning and polishing action of the arms as they slide along each grounding shoe, coupled with the floating biasing engagement of each shoe pipe with the trolley hanger arms in response to the downwardly acting spring and gravitational force acting on each shoe pipe, further synergistically contribute to spark-free operation, less energy loss and improved electrocoating performance relative to each part 46.

Figures 8, 9A, 9B, 10A, 10B, 11A:
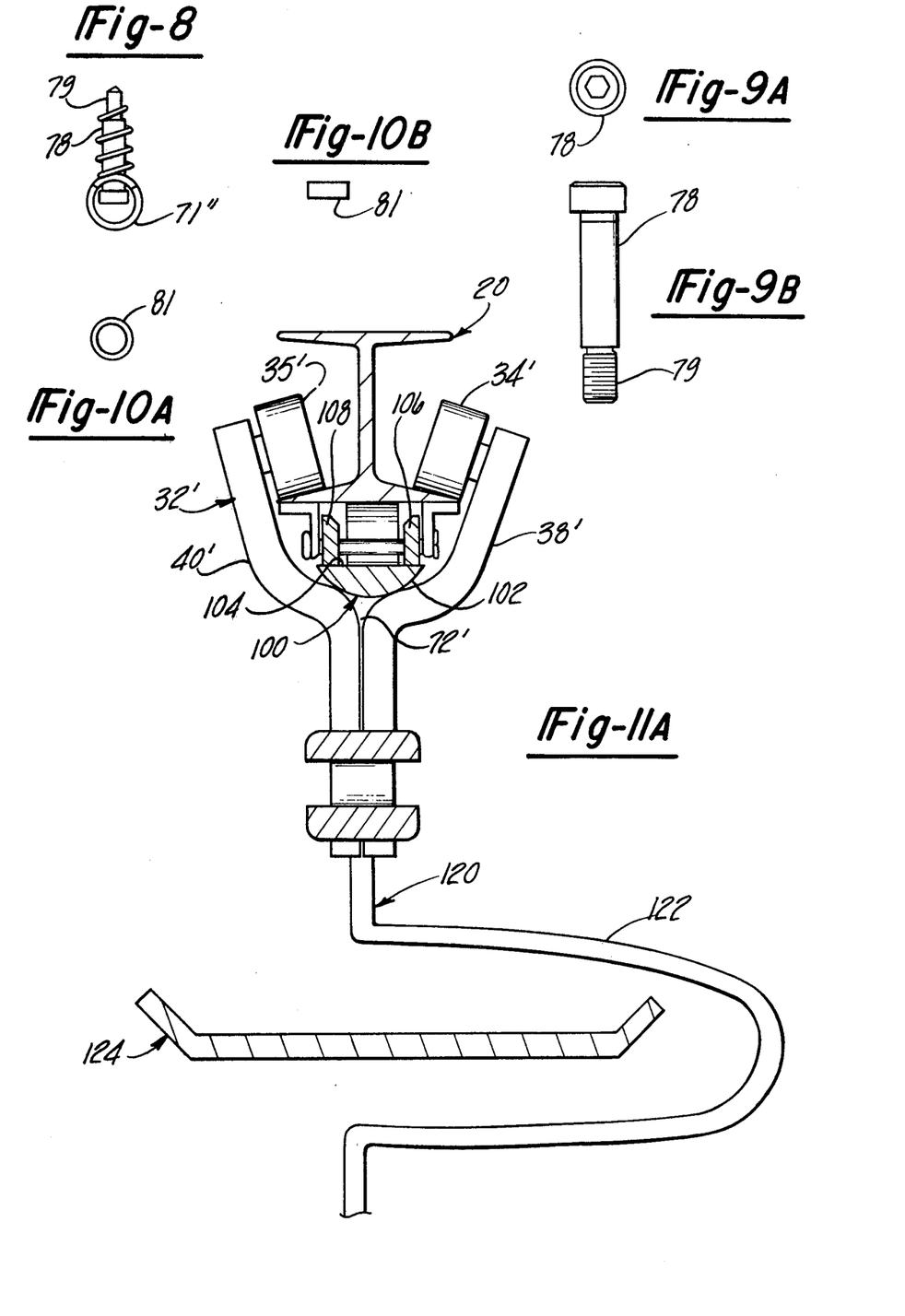
FIG. 8 is an end elevational view taken on the line 8—8 of FIG. 7.
FIGS. 9A and 9B are enlarged top plan and side elevational views respectively of the shoe mounting stud shown in FIGS. 1, 5, 7 and 8.
FIGS. 10A and 10B are top plan and side elevational views respectively of the shoulder bolt spacer employed with the mounting stud of FIGS. 9A and 9B.
FIG. 11A is a vertical cross-sectional view corresponding to that of FIG. 2 but taken on the line 11A—11A of FIG. 11B illustrating a modified form of the grounding system of the invention.
Figure 11B:
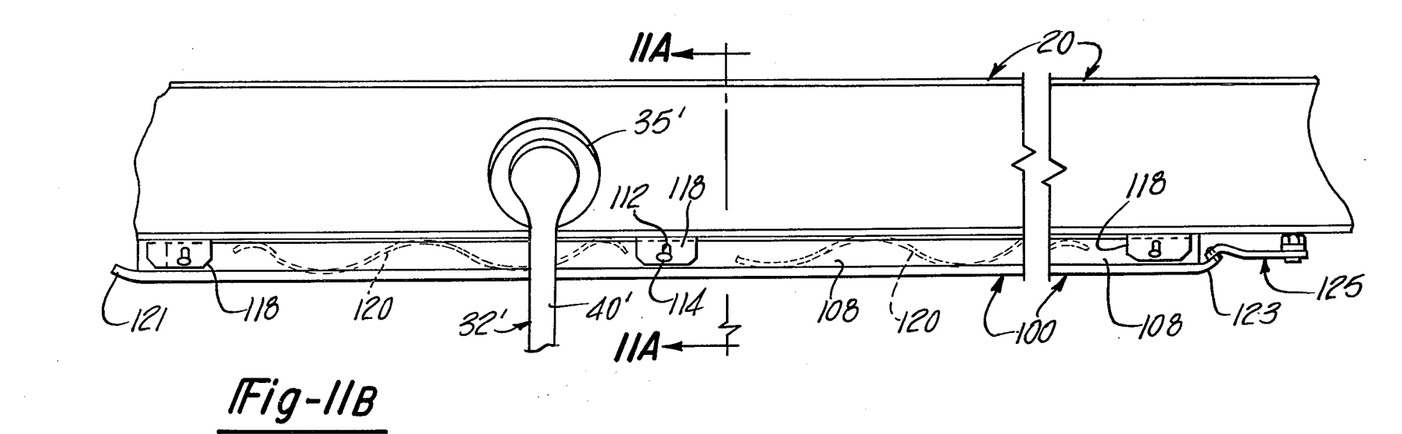
FIG. 11B is a fragmentary side elevational view of the modified grounding shoe system of FIG. 11A.
Figure 11C:
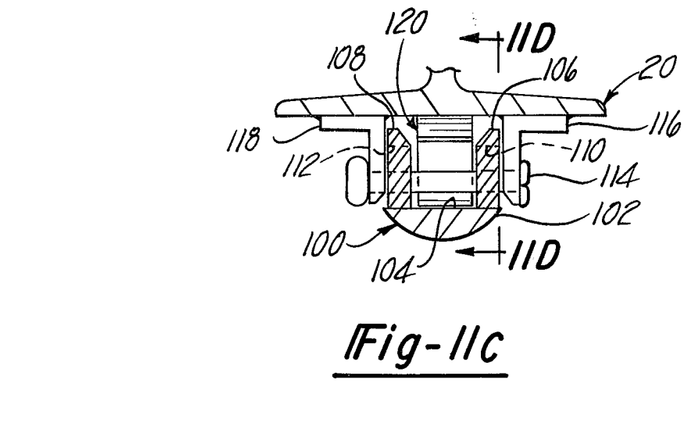
FIG. 11C is a fragmentary vertical cross sectional view taken on the line 11A—11A of FIG. 11B but omitting the trolley and drip tray structure of FIG. 11A.
Figure 11D:
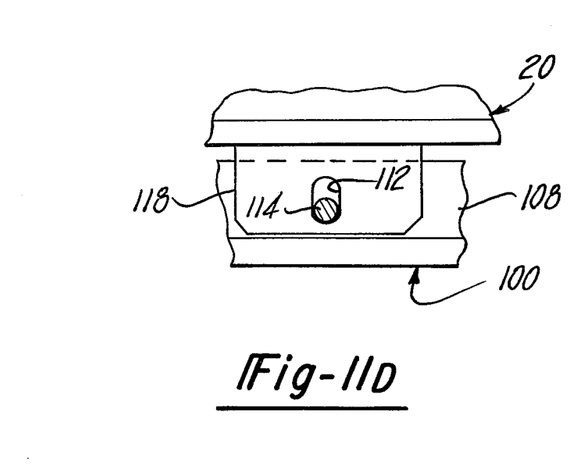
FIG. 11D is a fragmentary vertical cross sectional view taken on the line 11D—11D of FIG. 11C—11C.

The disposition of the shoe/arm grounding points of contacts interiorly of the trolley arms provides further co-operative advantages. With the grounding shoes being positioned centrally of and directly beneath the lower flange of the monorail I-beam, the shoes as well as the associated tangential contact points of the arms are sheltered by beam 20 from dirt, grease or other debris falling from the trolley wheel and track way structure. The centralized, sheltered location of the grounding shoe system of the present invention insures that any debris, rust, scale or other matter wiped free of the trolleys and/or grounding shoe structure originates from a zone confined laterally within dimensional limits which are less than those of the overhead monorail track-way and wheels of the trolleys. Thus, as described hereinafter in conjunction with the modified embodiment of FIG. 11, this feature enables the grounding shoe system of the present invention to be used with conventional catch pan or drip tray arrangements having a lateral dimension of minimum size, i.e., one designed merely to accommodate the lateral dimensions of the overhead conveyor structure, thereby further saving on space and structural cost in the conveyorized electrocoating system.

Other advantages of the present invention over prior art systems include reduction of wear on the conveyor drive chain 41, more continuous electrical grounding contact, longer shoe life as well as simpler and more economical construction, installation and maintenace.

In addition, the grounding shoe systems of the present invention are compatible with most conventional trolley assemblies of the dual-wheel, Y-arm configuration, and hence specially constructed or custom trolley assemblies are not required, thereby enabling the grounding system of the present invention to be installed as a conversion item on electrocoating conveyor lines without modification of the existing monorail track, associated trolleys and drive chain equipment.

Referring to FIGS. 11A through 11D, a modified form of grounding shoe is shown in accordance with a further embodiment of the invention, the same being associated with the previously described monorail beam 20 and a slightly modified but still conventional dual-wheel Y-type trolley 32'. The grounding shoe system of FIGS. 11A-11D comprises a steel bar stock contact shoe 100 having a rounded undersurface 102 which may be of circular cross-section, or other suitable curvature such as elliptical or the like, and which is suitably dimensioned to provide dual tangential sliding contact with the trolley yoke via the interior surfaces of arms 38' and 40' at points spaced slightly above the vertex junction 72' thereof, similar to shoe pipes 71,71',71" described previously. The upper surface 104 of shoe 100 is flat and disposed horizontally and has a pair of laterally spaced upright hanger bracket plates 106 and 108 welded thereto respectively adjacent each of the laterally opposite edges of shoe 100. Each of the brackets 106,108 has a vertically elongated slot 110,112 through which is slidably received a mounting bolt 114 which in turn is suitably secured at its ends via bolt holes in the vertical flanges of a pair of angle iron mounting brackets 116 and 118. The upper horizontal flanges of brackets 116 and 118 are suitably affixed, as by welding or studs, to the undersurface of the lower flange of the monorail I-beam.

A suitable biasing spring or springs 120 is disposed in captured relation between the lower flange of beam 20 and the upper surface 104 of shoe 100, and laterally between brackets 106 and 108. Spring 120 may comprise a wave-type spring of vertically undulating spring steel stock or the like extending along the length of shoe 100, or, alternatively, may consist of two or more compression coil springs. Shoe 100 has a limited freedom of vertical motion defined by the relative movement of bolts 114 in associated slots 110,112, which corresponds in general to the range of vertical movement of the previously described shoes 70,70',70". In the lowermost position of shoe 100, the upper edges of slots 110,112 rest on bolt 114 with spring 120 under slight compression in this condition, shoe 104 thus being biased downwardly by spring 120 as well as by the weight of the shoe structure itself.

The undersurface 102 of shoe 100 is tapered upwardly at its ends to provide entrance and exit ramps 121 and 123 similar to ramps 80 and 82. A grounding safety strap similar to strap 92 may be provided to electrically interconnect shoe 100 with beam 20, if desired, but adequate electrical grounding contact between shoe 100 and beam 20 is normally provided through the constant sliding contact of wave spring 120 with surface 104 and the undersurface of the I-beam 20. In lieu of stabilizer 94, a flexible spring-metal stabilizer strap 125 (FIG. 11B) is mounted at one end to the undersurface of beam 20 and at its other end to the downstream end 123 of shoe 100 to take the trolley-drag shear loading off of pins 114 while permitting the limited vertical floating movement of shoe 100.

The hanger bracket 120 which is fixed to and depends from lower ends of trolley arms 38' and 40' includes a conventional C-bight 122 adapted to pass around a standard chain conveyor drip tray 124. The lateral dimension of tray 124 is only slightly larger than the maximum lateral dimension of the overhead conveyor and trolley structure. It will thus be noted that shoe 100, like shoes 70,70',70" and the associated shoe support and biasing structure is not only sheltered beneath beam 20 but is also centrally located above drip tray 124, well within the outer limits of the zone of the falling debris, rust, scale or other foreign matter intended to be caught by drip tray 124 in order to prevent contamination of the electrocoat bath. The modified grounding shoe system of FIG. 11 thus embodies the aforementioned advantages of the system of FIGS. 1-10A, and in some applications may be easier to install due to the welded attachment of brackets 116,118 to beam 120, as well as to the slip-in installation of wave-spring 120.

Figure 12:
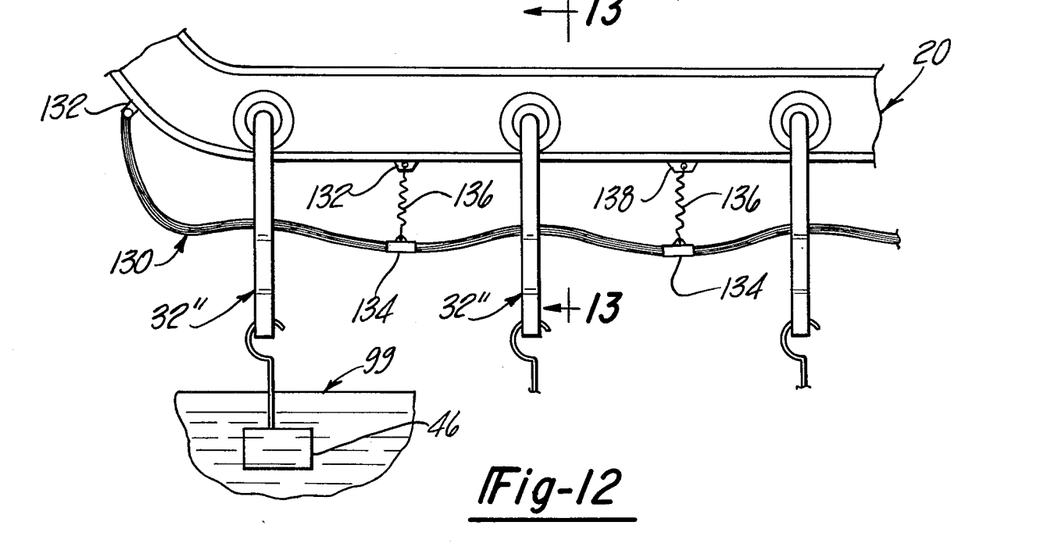
FIG. 12 is a schematic side elevational view of still another form of a grounding system in accordance with the invention.
Figure 13:
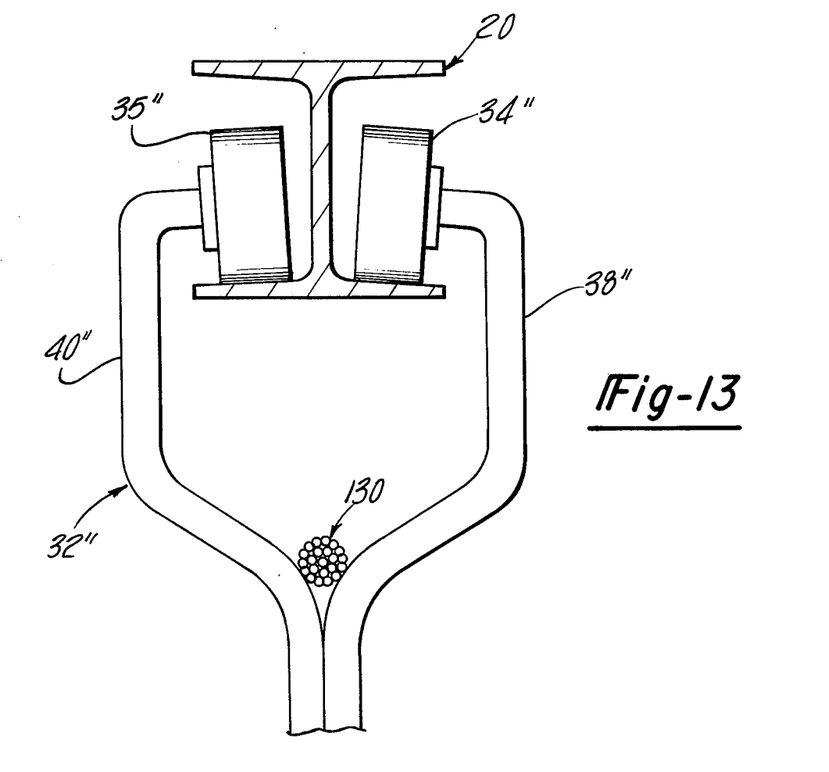
FIG. 13 is a vertical cross sectional view taken on the line 13—13 of FIG. 12.

Referring to FIGS. 12 and 13, a further embodiment of the invention is illustrated in semi-schematic form, those parts identical to parts previously shown and described herein being given like reference numerals and their description not repeated. In this embodiment, the grounding shoe system comprises a flexible cable 130 made of electrically conductive wire strands, in either twisted rope or braided form, securely hung at its opposite ends to beam 20 by suitable electrically conductive cable end terminal fasteners 132. Cable 130 may be made up in standard lengths, such as four feet, with such cable lengths being joined in tandem end-to-end relation by connector sleeves 134 which mechanically and electrically interconnect the paired cable ends. If desired to relieve some of the cable weight from the trolleys, tension coil springs 136 may be installed at intervals along cable 130 by connecting the lower end of each spring to an associated sleeve 134 and the upper end of the spring to a suitable hanger bracket 138 which in turn is affixed, as by welding or bolts, to the underside of beam 20.

In the cable grounding shoe system of FIGS. 12 and 13, cable 130 is dimensioned and hung from beam 20 such that it rests loosely upon the interior surfaces of arms 38" and 40" of each of the trolleys 32" as they travel along the cable. The interior surfaces of arms 38" and 40" thus make a sliding, dual-tangential electrical contact with cable 130 to thereby provide the electrical grounding path from the trolley to beam 20. The weight of the cable itself provides the downward biasing force to insure that such electrical contact is constantly maintained with each trolley, and the flexibility of the cable permits upward yielding movement thereof against its self-biasing gravitational biasing force to insure constant tracking of the cable in contact with the moving trolleys. Although in most instances, the diameter of cable 130 will be less than the diameter of shoe pipes 71,71' and the bar stock shoe 100 of the previously described embodiments, if a larger radius of curvature is desired, cable 130 may be made in the form of an armored hose wherein a hollow tubular length of flexible rubber hose or the like has an outer metallic braided covering, such as commercially employed with reinforced hydraulic pressure lines. A larger diameter cable so constructed will retain the flexibility and gravitational bias characteristics of a solid wire rope strand or braided wire cable but with a savings in weight and material per unit length.

Although the cable shoe system of FIGS. 12 and 13 operates in a manner similarly to the previously described grounding shoe systems of the invention and possesses many of the same advantages thereof, in certain applications ultimate wear life of the cable surface may be less than that of the pipe stock shoe of the system of FIGS. 1–10A or the bar stock shoe of the system of FIG. 11. However, the cable shoe system, because of its flexibility and limp sagging suspension relative to the trolleys engaged thereby, offers a high degree of conformability to insure continuous electrical contact between beam 20 and each and every trolley transitting the cable. In addition, the cable system consists of a minimum number of parts, is easy to install and maintain and enhances system electrical and electrocoating performance.

I claim:

1. In electrocoating equipment having a conveyor rail with a trolley movable therealong for carrying parts through a bath to be electrocoated, said trolley comprising wheels, arms dependent from said wheels below said rail and a part carrier suspended from said arms, and drive means for the trolley, the improvement comprising grounding shoe means suspended from said rail between said rail and said arms and being electrically connected to the ground return side of a power supply system associated with said electrocoating equipment, said grounding shoe means being disposed in sliding electrical contact with at least one of said arms of said trolley and extending along the path of travel thereof while the same is transitting the electrocoating bath of said equipment, said grounding shoe means being yieldably biased into such contact with said arm and having at least a limited degree of vertical movement relative to said rail to accommodate like movement of the trolley arm during its transit of said grounding shoe means.

2. The electrocoating equipment of claim 1 wherein trolley cleanout means are provided on said rail adjacent the path of travel of said trolley arm and upstream of said grounding shoe means, said trolley cleanout means normally having a slight clearance with said arm and being adapted to dislodge foreign matter clinging to said arm or to obstruct movement of the trolley if the foreign matter remains adhered thereto upon striking said trolley cleanout means.

3. The electrocoating equipment set forth in claim 2 including trolley cleaning brush means mounted on said rail adjacent the path of travel of the trolley arm and upstream of said grounding shoe means, said trolley cleaning brush means being disposed for wiping engagement with said arm at least in the area of contact of the arm with said shoe means as the trolley passes by said brush means.

4. The electrocoating equipment of claim 3 wherein said cleaning brush means is located between said trolley cleanout means and said grounding shoe means.

5. The electrocoating equipment set forth in claims 1, 2, 3 or 4 wherein said trolley arms are in the form of a generally Y-shaped yoke configuration and are connected to one another beneath said rail so as to define an interior space in the yoke of the Y beneath said rail, said grounding shoe means being disposed within the yoke space so as to make sliding contact with the interior surface of at least one of said arms facing said yoke space.

6. The electrocoating equipment set forth in claim 5 wherein said grounding shoe means has a curved exterior surface with a radius of curvature such that said grounding shoe means makes a dual tangential contact with said arms along the interior surfaces thereof at one point on each arm spaced above the vertex arm junction of said yoke.

7. The electrocoating equipment set forth in claim 6 wherein said grounding shoe means comprises an elongated solid member having a curved undersurface adapted to make said dual tangential contact with said trolley arms during transit of the trolley arm along said grounding member.

8. The electrocoating equipment set forth in claim 7 wherein said grounding member has a vertical movement lost motion suspension from said rail defining positive upper and lower limits of vertical movement of said grounding member, and including spring means disposed between said grounding member means and said rail for yieldably biasing said grounding shoe means downwardly.

9. The electrocoating equipment set forth in claim 8 wherein said lost motion suspension means comprises bracket means affixed to the upper side of said member, mounting angle means affixed to the underside of said rail, and pin and slot fastener means interconnecting said bracket means and said mounting angle means.

10. The electrocoating equipment set forth in claim 7 wherein the upper surface of said member is generally flat, and spring means are captured in the space vertically between the upper surface of said member and the undersurface of said rail and acts in compression to bias said bar downwardly relative to said rail.

11. The electrocoating equipment set forth in claim 10 wherein said spring means comprises a wave spring having vertically alternating crest-to-crest contact with the upper surface of said member and the undersurface of said rail.

12. The electrocoating equipment set forth in claim 5 wherein said grounding shoe means comprises a hollow tubular member made of electrically conductive material, and means suspending said member from the underside of said beam for limited vertical movement relative thereto.

13. The electrocoating equipment set forth in claim 12 wherein said suspension means comprises a pair of mounting studs disposed one adjacent each of the opposite ends of said member and secured to the underside of said rail with said member having an up and down sliding movement on said studs.

14. The electrocoating equipment set forth in claim 13 wherein said member has a flexible ground safety strap electrically interconnecting said member with said rail to accommodate said vertical movement of said member.

15. The electrocoating equipment set forth in claim 12 wherein said grounding shoe means has tapered entrance and exit edges along the undersurface thereof for camming engagement with said trolley arm upon initial engagement with said grounding shoe means such that said trolley lifts said grounding shoe means against downward biasing forces exerted thereon during the sliding contact of said trolley with said grounding shoe means.

16. The electrocoating equipment set forth in claim 6 wherein said grounding shoe means comprises a flexible element suspended from said rail and extending along the path of travel of said trolley such that said flexible element rests upon and is gravitationally biased into said dual trangential sliding engagement with said trolley arms, at least the exterior surface of said flexible element comprising an electrically conductive metallic material, and means electrically connecting said conductive surface in grounding relation to said rail in bypass relation to said trolley wheels.

17. The electrocoating equipment set forth in claim 16 wherein said flexible element comprises a cable made up of twisted or braided strands of electrically conductive metallic material.

18. The electrocoating equipment set forth in claim 16 wherein said flexible element comprises a plurality of lengths of such elements, said lengths being joined at adjacent ends by connectors at intervals along said rail, and hanger means interconnecting said connectors to said rail.

19. The electrocoating equipment set forth in claim 18 wherein said hanger means comprise tension spring means partially supporting the weight load of said flexible element.

20. The electrocoating equipment set forth in claim 1, 2, 3 or 4 wherein said grounding shoe means comprises a plurality of shoes disposed in tandem end-to-end relation along the underside of said rail generally parallel to the longitudinal axis thereof, and said electrocoating equipment includes a plurality of said trolleys interconnected by said drive means at equally spaced intervals along the rail, the longitudinal dimension of each grounding shoe being such that at least three of said trolleys simultaneously overlap each shoe during movement of the trolleys along said rail.

21. The electrocoating equipment set forth in claim 1, 2, 3 or 4 wherein a drip tray is disposed beneath the path of travel of the trolley along the rail and over the electrocoating bath, said grounding shoe means being aligned centrally of said tray.

22. The electrocoating equipment of claim 21, and wherein said trolley arms are in the form of a generally Y-shaped yoke configuration and are connected to one another beneath said rail so as to define an interior space in the yoke of the Y beneath said rail, said grounding shoe means being disposed within the yoke space so as to make sliding contact with the interior surface of at least one of said arms facing said yoke space, said shoe means being sheltered vertically beneath said rail.

23. The electrocoating equipment set forth in claim 1 wherein said grounding shoe means has a curvature along its longitudinal axis complimental to the longitudinal axis of the co-extensive portion of said rail.

24. The electrocoating equipment set forth in claim 1 wherein said grounding shoe means includes a stabilizer bracket rigidly affixed to the underside of said rail and disposed in abutting relation with the trailing end of said grounding shoe means such that the trailing end of said grounding shoe is slidable vertically against an abutment surface of said stabilizing means.

25. In electrolytic processing equipment having a conveyor rail with a trolley movable therealong for carrying parts through a bath to be processed electrolytically, said trolley having at least one arm dependent therefrom below said rail and a part carrier suspended from said arm, and drive means for the trolley, the improvement comprising electrical contact shoe means suspended from said rail and being electrically connected to a power supply system associated with said equipment, said shoe means being disposed in sliding electrical contact with said arm and extending along the path of travel thereof while the same is transitting the bath, said shoe means being yieldably biased into such contact with said arm and having at least a limited degree of vertical movement relative to said rail to accommodate like movement of the trolley arm during its transit of said shoe means.

26. The equipment of claim 25 wherein said rail comprises an I-beam and including a plurality of said trolleys each comprising dual wheels flanking the web of said beam and having a pair of yoke arms dependent from said wheels and merging below said rail, and said drive means comprises an electrically conductive chain interconnecting said trolleys, said shoe means being suspended from said rail between said yoke arms and being electrically connected to the ground return side of the power supply system.

* * * * *